UNITED STATES PATENT OFFICE.

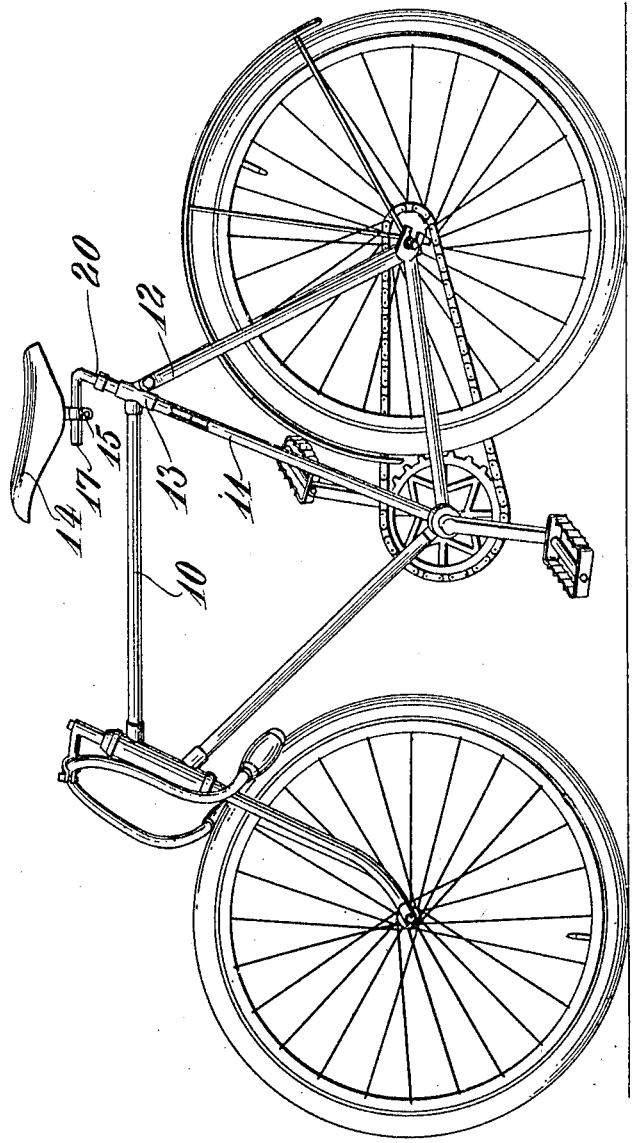

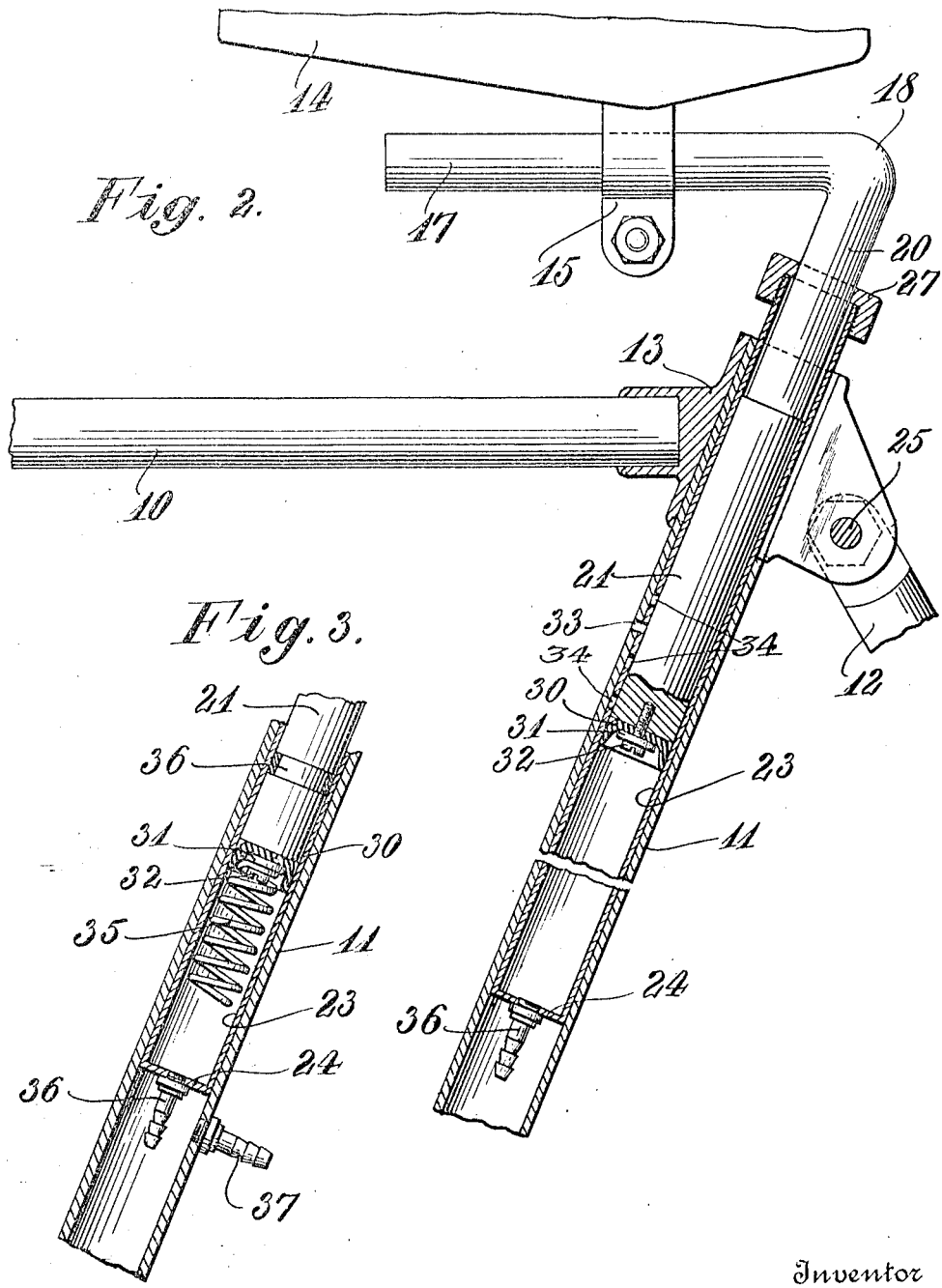

LOWERRE B. REED, OF RUTHERFORD, NEW JERSEY.

PNEUMATIC SADDLE-POST AND PUMP.

1,270,661. Specification of Letters Patent. Patented June 25, 1918.

Application filed March 2, 1917. Serial No. 151,935.

*To all whom it may concern:*

Be it known that I, LOWERRE B. REED, a citizen of the United States, resident of Rutherford, county of Bergen, and State of New Jersey, have invented certain new and useful Improvements in Pneumatic Saddle-Posts and Pumps, of which the following is a specification.

This invention relates to improvements in seat posts, and particularly to those which are air-cushioned.

The principal object of the invention is to provide a pneumatic seat post in which the air-cushion is limitedly adjustable to carry the weight of the rider.

Another object is to provide means combined therewith whereby the air used as a cushion may be compressed to any desired extent by movement of the seat post itself, such devices being particularly applicable to bicycles, motorcycles, and the like, but which obviously may be used wherever desired.

A still further object is to so arrange the seat post that it, together with the pneumatic casing, can be readily removed and used as an air pump for inflating tires and other like purposes.

These and other like objects are attained by the novel construction and combination of parts hereafter described and shown in the accompanying drawings, forming a material part of this specification, and in which:—

Figure 1 is a side elevational view showing a conventional type of bicycle and indicating the application of the invention.

Fig. 2 is an enlarged fragmental sectional view of the same, parts being in section to show the interior, and Fig. 3 is a similar sectional view showing a fragment of the invention and indicating a modification in construction.

In the drawings, the numeral 10 designates the compressive member of a bicycle frame of the usual type, 11 the strut member, and 12 one of the rear forks, all parts being engaged in a head 13 so as to be firmly secured together.

The saddle 14 has at its lower side a bracket 15 which may be clamped in any preferred adjustment along the horizontal bar 17, the same extending rearwardly to the curve 18 and formed integrally with the downwardly extending, angularly disposed element 20 which has at its end an enlarged piston 21 neatly fitted to slide in a tubular casing 23 formed with a solid bottom 24, the upper end of the casing being engaged by a nut 27 above the head 13, which prevents the removal of the plunger.

It is to be understood that the exterior of the casing 23 is closely fitted to the tubular strut 11, and can be clamped in any desired adjustment therein by the bolt 25 passing through lugs formed with an encircling head 13, the head 13 and tube 11 being slotted for that purpose, the bolt also securing the rear forks 12 is position.

Secured to the lowermost end of the piston 21 is a cup-leather 30 held by the washer 31 and screw 32, the same being of the well-known pump piston type and which is adapted to operate within the casing 23. Pumping may be accomplished by the removal of the saddle 14, grasping the bar 17, and operating the same in the manner of a pump, whereby air is caused to enter through the opening 33 in the strut 11, and thence pass through any of the openings 34 in the wall of the tubular casing 23 and become compressed by moving the plunger 21 downward until a desired pressure has been attained.

Inserted through the bottom 24 of the cylindrical pump casing is an air valve 36 so that when the casing and plunger is removed the parts form in effect an air pump which may be applied as desired through the use of a flexible hose as is common and, if preferred, a similar valve 37 can be inserted through the wall of the strut 11 to which a hose may be attached leading to the tires or otherwise, the tubular strut in this case acting as a reservoir for the compressed air.

In the form shown in Fig. 3, in addition to the parts hereinbefore mentioned, a spring 35 is attached by means of the screw 32 to the plunger 21 in such manner that should the plunger be depressed beyond a certain amount, the outer, free end of the spring will make contact with the head 24 limiting the action and cushioning the motion thereof, and in addition thereto, it may be preferred to form one or more annular grooves in the lower part of the plunger 21 for packing rings 36 which in addition to the cup-leather 30, prevents the upward passage of air past the plunger.

The construction and operation are believed to be evident from the foregoing, taken in connection with the drawings, but it may be stated that should the pressure be reduced below a desired point, it may be increased while the rider is on the saddle by raising and lowering the body, causing the seat to rise and fall, effecting a pumping movement which will increase the pressure to any desired extent.

It is to be understood that the forms shown are not held to limit the invention, as many of the details may be changed in form or position without effecting the operativeness or use of the invention.

Having thus described my invention, what I claim as new, and desire to secure by Letters Patent, is:—

In combination, with a bicycle frame including the diagonal strut, carrying a tubular head at its upper end, an elongated tubular casing snugly and frictionally fitting the tubular strut in adjustable relation therein, an elongated piston slidably mounted in said tubular casing and having an integral angular horizontal bar carrying the bicycle seat, a leather cup piston secured to the lower end of said piston, said tubular casing being formed with a longitudinal series of lateral ports, and said tubular strut being formed with a single port, with which any of the other ports is adapted to communicate, said integral horizontal bar serving also as a pump handle, the lower end of said tubular casing being closed, and a valve projecting below the closed end of said casing for discharging the air pumped from said tubular casing.

In testimony whereof I have affixed my signature.

LOWERRE B. REED.